Figure 2:
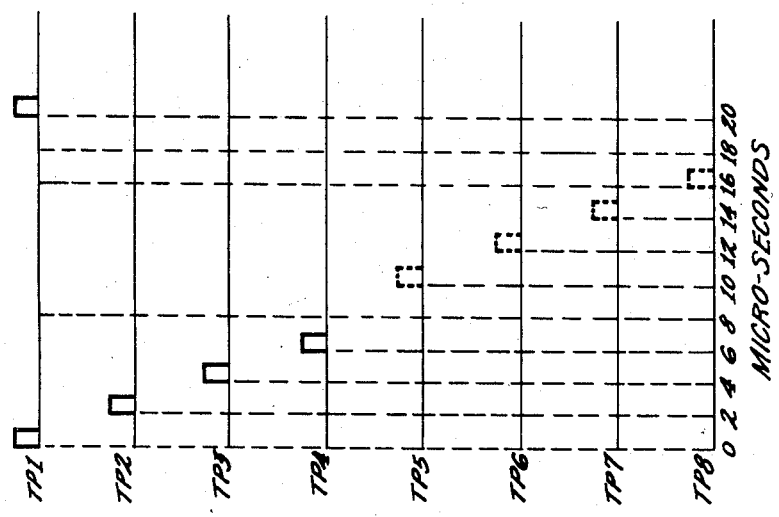

Nov. 11, 1958

M. KAPLAN 2,860,243

PULSE GENERATOR

Filed April 20, 1955

INVENTOR.
MARTIN KAPLAN
BY
ATTORNEY.

United States Patent Office 2,860,243
Patented Nov. 11, 1958

2,860,243

PULSE GENERATOR

Martin Kaplan, Camden, N. J., assignor to Radio Corporation of America, a corporation of Delaware Application April 20, 1955, Serial No. 502,572

10 Claims. (Cl. 250—27)

This invention relates to a pulse generator, and more particularly to a device for generating sequential timing pulses on a plurality of channels.

The need arises in such fields as multiplexing and computing for a means of sequentially generating pulses on several channels in synchronism with a basic timing rate. In the computing field, for example, these pulses, referred to as either timing pulses or clock pulses, are used as the basic time indications to which the computer operation is keyed. Thus, for example, it may be desired to generate this series of timing pulses in synchronism with the pulses derived from the timing track of a magnetic drum.

Many of the known pulse generating systems are complex and require excessive circuitry. Often these systems, partly because of their complexity, are not as reliable as may be desired. Further, many of these systems are fixed in their mode of operation and are not susceptible to a variable distribution of the pulses to the several channels or groups of channels.

Accordingly, an object of this invention is to provide an improved device for generating pulses which device has a more reliable and accurate operation than the devices of the prior art.

Another object of this invention is to provide an improved device for generating sequential pulses on parallel channels which device is more economical of equipment than those devices heretofore known.

A further object of this invention is to provide an improved circuit for providing a sequential timing pulse on successive parallel channels which circuit employs a number of delay lines reduced over those heretofore required to provide pulses on a maximum number of output channels.

Still another object of this invention is to provide an improved device for generating selected timing signals on parallel output channels in response to coding signals.

In accordance with this invention, an output distribution of sequential pulses is produced on a selected number of parallel output channels in synchronism with serial input pulses. In one embodiment of the invention, the serial pulses are passed through a group of delay lines which are tapped at successive equal intervals. The delayed pulses at these successive tapped intervals are simultaneously applied to two independent groups of "and" gates. These two groups of "and" gates are alternately turned on and off by a commutating flip-flop to pass or block the successive iterations of delayed pulses. The commutating flip-flop is alternately turned on and off by feeding back the output of one gate of each group of gates to the input of the flip-flop.

In this manner, for example, two successive input pulses may provide a total of eight successive timing pulses, four timing pulses being generated by each group of gates. Each "and" gate output provides one output channel. In an alternative mode of operation, by inhibiting the feedback to the commutating flip-flop, the number of output channels may be reduced from eight to four, each output channel producing one sequential pulse for every input pulse.

Figure 1:
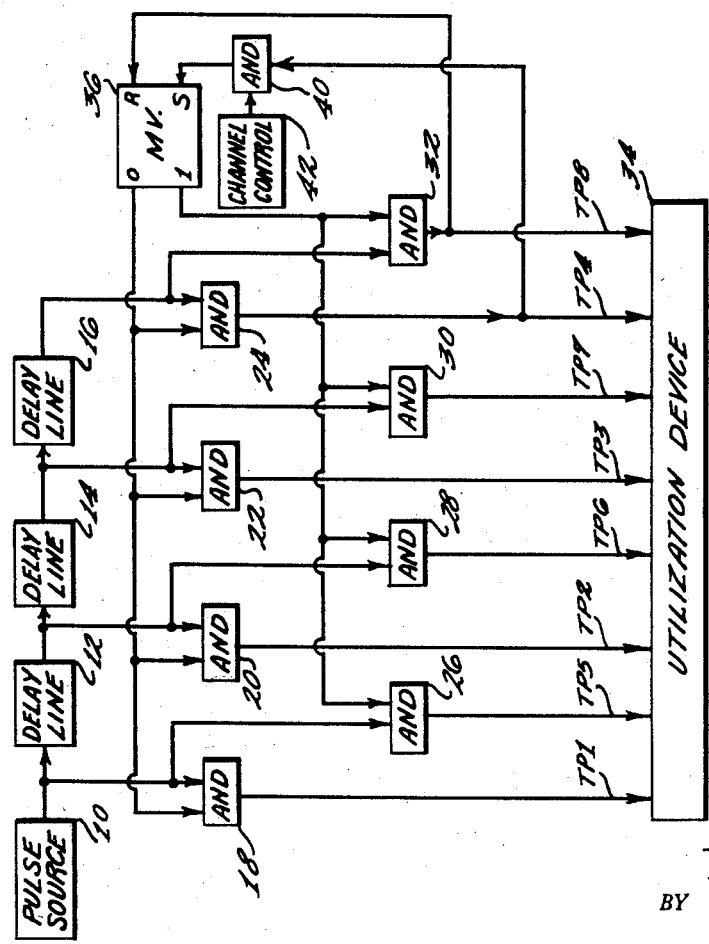

The novel features of this invention as well as the invention itself, both as to its organization and method of operation will best be understood from the following description when read in connection with the accompanying drawings in which:

Figure 1 represents a block schematic of an arrangement in accordance with the invention, Figure 2 illustrates the timing pulses produced in accordance with the embodiment of this invention shown in Figure 1.

With reference to Figure 1 of the drawing, a pulse source, illustrated by the block 10, is serially connected to a chain of delay lines 12, 14 and 16. This pulse source may be of any suitable type known in the art. By way of example, in computing operations the pulse source 10 may be of pulses derived from the timing track of a magnetic drum. Similarly, the delay lines may be, by way of illustration, a plurality of L networks. The output of the pulse source 10 and the outputs from each of the delay line sections 12, 14 and 16 is coupled to a first of two inputs of each "and" gate 18, 20, 22, and 24, comprising a first group of two-input "and" gates. These "and" gates are coincidence gates, which operate to produce an output signal upon the coincidence of input signals, and are well known in the art. The output of the pulse source 10 and of each of the delay line sections 12, 14 and 16, in addition to being connected to each gate of the first group of "and" gates 18, 20, 22 and 24 are also connected respectively to the first of two inputs of each "and" gate 26, 28, 30, and 32 comprising a second group of two-input "and" gates. The output of each "and" gate in both the first and second groups of "and" gates is connected to the inputs of a system herein broadly termed a utilization device 34. The outputs of the first group of "and" gates are herein labeled TP1, TP2, TP3, and TP4, and that of the second group of "and" gates, TP5, TP6, TP7, and TP8 for convenience. Thus, eight parallel channels are provided to the utilization device 34 which may, for example, be the program control unit of a computer or some portion of the decoding apparatus for a multiplex system.

A commutating bistable multivibrator 36 which may be, for example, an Eccles-Jordan flip-flop, is employed. An Eccles-Jordan flip-flop has two input terminals herein designated as the set and reset terminals S and R, respectively. Two output terminals designated 1 and 0 correspond to the set and reset terminals S and R, respectively. During operation of the bistable multivibrator, steady state potentials, one of high and one of low amplitude levels appear on these output terminals. As herein used, steady state signifies a quiescent condition unaffected by the passage of time alone. The instant relationship of the high and low level outputs on the terminals of the flip-flop (that is, bistable multivibrator) may be reversed by the application of a proper input signal so that the flip-flop may be said to have two stable states of operation. A high level output on the "1" output terminal is designated as a binary one and a low level output on the "1" output terminal is designated as a binary zero. The flip-flop may be turned over or switched from one stable state to another by the application of input pulses of the proper polarity to the proper input terminal. Thus, in the illustration herein shown, a proper polarity pulse applied to the reset input produces a stable state in the flip-flop wherein the reset or "0" output is at a high level and the set output is at a corresponding low level. This stable state is referred to as the reset state, and the flip-flop is said to be reset. Conversely, the application of a proper polarity pulse to the set input will provide a high level at the "1" output and a corresponding low level at the "0" output. In this stable state, the flip-flop is in the set state and is said to be "set."

The reset, that is "zero," output of the commutating flip-flop 36 is connected to the second input of the first group of "and" 18, 20, 22, and 24. Because of its mode of operation, the second input to each of the "and" gates is designated herein as the priming (also sometimes termed, the enabling) input. The "one" output of the commutating flip-flop 36 is correspondingly connected to the second input (that is, priming input) of each of the second group of "and" gates 26, 28, 30 and 32.

The output of the "last-in-time" "and" gate 24 of the first group of "and" gates is also connected to the first input of an "and" gate 40, the output of which is connected to the set input of the commutating flip-flop 36. The second (that is, priming) input to the "and" gate 40 is provided by a pulse source herein designated by the block 42 which is entitled channel control. This channel control unit 42 may be a bistable multivibrator of the type heretofore described or any other suitable source of two distinct levels of voltage high and low. The output of the "last-in-time" "and" gate 32, of the second group of "and" gates, is also coupled to the reset input of the commutating flip-flop 36 to complete the circuit interconnections.

The operation of the circuit of Figure 1 may best be understood by referring also to Figure 2 which illustrates the time sequence of the timing pulses TP1 through TP8, inclusive, which are produced on the several channels of the circuit of Figure 1. For explanatory purposes, say that pulse source 10 produces a clock (synchronizing) pulse every 10 microseconds and that the delay line sections 12, 14 and 16 each provide a time delay of two microseconds. Under these conditions, the clock pulses appear at the successive pairs of "and" gates 18—26, 20—28, 22—30, and 24—32 at two microsecond intervals. Assume for the moment that the channel control 42 output is high, thereby providing a priming voltage to "and" gate 40. Also assume that the commutating flip-flop 36 is in a reset condition, thereby applying a priming input to each of the first group of "and" gates 18, 20, 22 and 24. Correspondingly, no priming input is applied to the second group of "and" gates 26, 28, 30 and 32 and these gates will block the passage of any input pulses.

Upon the advent of the first clock pulse from the pulse source 10 to the pair of "and" gates 18—26, "and" gate 18 of the pair, being in a primed condition, allows this pulse to pass thereby producing TP1 as illustrated in Figure 2. "And" gate 26 of the pair, not being primed, blocks the passage of the clock pulse. In a similar manner, as this first clock pulse leaves each of the series of delay line sections 12, 14 and 16 in sequence, it passes through each of the previously primed "and" gates 20, 22, and 24 to provide timing pulses TP2, TP3, TP4 illustrated in Figure 2. One may say that the initial clock pulse becomes timing pulse TP1; the initial clock pulse, delayed two microseconds, becomes timing pulse TP2; the initial clock pulse delayed four microseconds becomes timing pulse TP3; and the initial clock pulse delayed six microseconds becomes timing pulse TP4.

Timing pulse TP4, in addition to being applied to the utilization device 34, is also applied to the first input of the "and" gate 40, associated with the commutating flip-flop 36. Under the conditions assumed above, the channel control 42 has applied a priming signal to the priming input of the "and" gate 40. Thus, the timing pulse TP4 will pass through "and" gate 40 and set, that is, reverse, the commutating flip-flop 36. Setting of the commutating flip-flop 36 produces a high level from the "one" output of the flip-flop and a corresponding low level at the "zero" output. The first group of "and" gates 18, 20, 22 and 24 have now lost their priming input, whereas the second group of "and" gates have now become primed.

In some applications, wherein the timing pulses are generated at a very high rate of speed, the action of the commutating flip-flop 36 may tend to prematurely cut-off (distort) TP4. This distortion results from the fact that the leading edge of TP4 is usually employed to reverse the commutating flip-flop. If this reversal occurs prior to the cessation of the delayed clock pulse (which upon passage through "and" gate 24 becomes TP4), the enabling voltage applied to "and" gate 24 is prematurely removed and TP4 is distorted. To prevent this distortion, the commutating flip-flop may be "set" by the trailing edge of TP4, instead of the leading edge. Such an arrangement may, by way of example, comprise a differentiating circuit connected to the set input of the commutating flip-flop 36 through a unilateral impedance. Alternatively, TP4 may be coupled through a delay line to the set input of the flip-flop 36.

The second clock pulse from the pulse source 10 will arrive 10 microseconds after the first, thus having no effect upon the first group of "and" gates. But this second clock pulse passes sequentially through the second group of "and" gates 26, 28, 30 and 32 in a similar manner to that described above. The outputs of these "and" gates produces TP5, TP6, TP7, and TP8 as will be understood from Figure 2, and the similarity to the production of timing pulses TP1 to TP4 from the first set of "and" gates. Timing pulse TP8, in addition to being applied to the utilization device 34, is applied to the reset input of the commutating flip-flop 36. Application of TP8 to the reset input again reverses the flip-flop to prime the first group of "and" gates 18, 20, 22, and 24. Since TP8 is susceptible to the same source of distortion as TP4 during the reversal of the commutating flip-flop 36, the same remedy is again applicable if necessary. Thus, TP8 may be delayed or the trailing edge thereof employed to reset the flip-flop 36. The pulse generating circuit is now in condition to receive the third clock pulse to produce, in the manner previously described, timing pulses TP1, TP2, TP3, and TP4. The process continues in this manner until cessation of the clock pulses.

Several alternative modes of operation are possible. For example, if the priming voltage from the channel control 42 is removed, "and" gate 40 never passes TP4 to set the commutating flip-flop 36. With the commutating flip-flop 36 reset initially, and with TP4 blocked from setting the flip-flop 36, a continuous spectrum of timing pulses TP1, TP2, TP3 and TP4, are repetitively produced in response to each clock pulse.

The principles of this invention may be extended to selectively provide varying numbers of output pulses on parallel channels. In this last mentioned embodiment, counting circuits may be employed in conjunction with the several groups of gates. In this manner the several groups of "and" gates may be controlled logically by connecting the several counting circuit outputs to selectively prime these gate inputs.

There has been hereinabove described an improved pulse generator, which automatically generates a spectrum of pulses on parallel channels in synchronism with a given clock pulse. The improved pulse generator requires a less amount of circuitry than prior generators. The particular circuit described is extremely reliable and accurate in operation and varying numbers of sequential output pulses may be obtained by simple control arrangements.

What is claimed is:

1. A signal generating circuit for generating pulses on parallel output channels in response to successive input impulses comprising, in combination, a first coincidence gate, a second coincidence gate, both said first and second coincidence gates being responsive to the same ones of said input impulses, coincidence means coupled to the output of said first coincidence gate, means to selectively prime said coincidence means, and a multivibrator having a first input and a second input, said first multivibrator input being selectively coupled to the output of said coincidence means, said second multivibrator input being coupled to the output of said second coincidence gate, said first coincidence gate being responsive to a given steady state output from said multivibrator, and said second coincidence gate being responsive to a different steady state output from said multivibrator.

2. An impulse responsive circuit for distributing signals on parallel output channels comprising, in combination, a first "and" gate responsive to said impulses, a second "and" gate responsive to said impulses, a bistable multivibrator having a set input and a reset input and operating to provide a first high level output in response to a reset input impulse and a second high level output in response to a set input impulse, a coincidence gate, and a control means coupled to a first input of said coincidence gate, the output of said first "and" gate being coupled to a second input of said coincidence gate, the output of said coincidence gate being coupled to the set input of said multivibrator, the output of said second "and" gate being coupled to the reset input of said multivibrator, said first output of said multivibrator being coupled to one of the inputs of said first "and" gate, and said second output of said multivibrator being coupled to one of the inputs of said second "and" gate whereby said first and second "and" gates selectively pass said impulses as determined by said control means.

3. A timing pulse generator comprising, in combination, a pulse source for generating sequential pulses, a first plurality of two-input "and" gates, a second plurality of two input "and" gates, said pulse source being connected to one input of a first one of said first plurality of two-input "and" gates, and connected to one input of a first one of said second plurality of two-input "and" gates, a delay line coupled to the output of said pulse source, the output of said delay line being coupled to one input of a second one of said first plurality of two-input "and" gates and to one input of a second one of said second plurality of two-input "and" gates, and a commutating flip-flop having a set input and a reset input and a pair of outputs responsive respectively to said set and reset inputs, a given one of the outputs of said flip-flop being coupled to the other input of each of said first plurality of two-input "and" gates, the other output of said commutating flip-flop being coupled to the other input of each of said second plurality of two-input "and" gates, the output of said second "and" gate of said first plurality of "and" gates being coupled to the set input of said commutating flip-flop, and the output of said second "and" gate of said second plurality of "and" gates being coupled to the reset input of said commutating flip-flop whereby said first and said second plurality of "and" gates are alternately primed.

4. The invention as claimed in claim 3 including a two-input coincidence gate wherein the output of said second "and" gate of said first plurality of "and" gates is connected through said two-input coincidence gate to the set input of said commutating flip-flop and wherein the second input to said two-input coincidence gate is coupled to a channel control signal whereby said first plurality of "and" gates selectively remains primed at all times.

5. A pulse generating circuit comprising a delay line means to secure successive pulses from said line, a first group of "and" gates respectively receiving said pulses, a second group of "and" gates respectively receiving said pulses, and a control circuit having two states, one of said states applying enabling signals to the gates of said first group and the other of said states applying enabling signals to the gates of said second group, said control circuit receiving the output of one gate of each group and responsive thereto.

6. A circuit for generating a plurality of output impulses responsive to input impulses comprising, in combination, a first plurality of coincidence means, a second plurality of coincidence means, each of said coincidence means having a first input and an output, said first input of both said first and said second pluralities of coincidence means including means for receiving said input impulses, means coupled to the output of one of said first plurality of coincidence means and to the output of one of said second plurality of coincidence means for selectively priming each of said first and said second pluralities of coincidence means.

7. A circuit for generating a plurality of output impulses responsive to input impulses comprising, in combination, a first plurality of coincidence gates, a second plurality of coincidence gates, each of said coincidence gates having a first input, a second input, and an output, said first input of both said first and said second pluralities of coincidence gates including means for receiving said input impulses, priming means coupled to the output of one of said first plurality of coincidence gates and coupled to the output of one of said second plurality of coincidence gates, said priming means being coupled to said second inputs of each one of said first and each one of said second pluralities of coincidence gates.

8. A circuit for generating a plurality of output signals responsive to input signals comprising, in combination, a first plurality of "and" gates, a second plurality of "and" gates, each of said "and" gates having a first input, a second input, and an output, said first input of both said first and said second pluralities of "and" gates being coupled for receiving said input signals, and priming means coupled to said second inputs of each of said first and said second plurality of "and" gates, said priming means being coupled to said output of one of said first plurality of "and" gates and to the output of one of said second plurality of "and" gates.

9. A signal generating circuit comprising, in combination, a pulse source for generating sequential pulses, a plurality of serially connected delay means coupled to the output of said pulse source, a first plurality of "and" gates, each one of said first plurality of "and" gates being responsive to a given output of a different one of said delay means, a second plurality of "and" gates, each one respectively of said second plurality of "and" gates being responsive to said given output of a different, corresponding one of said delay means, and means including a circuit having stable states and coupled to certain outputs from said "and" gates and responsive thereto to assume different said states for selectively priming said first and second plurality of "and" gates.

10. A signal generating circuit comprising, in combination, a pulse source for generating sequential pulses, a plurality of serially connected delay means coupled to the output of said pulse source, a first plurality of "and" gates, each one of said first plurality of "and" gates being responsive to a given output of a different one of said delay means, a second plurality of "and" gates, each one respectively of said second plurality of "and" gates being responsive to said given output of a corresponding, different one of said delay means, and means including a bistable multivibrator having a first input and a second input for selectively priming said first and second pluralities of "and" gates, the output of the one of said first plurality of "and" gates responsive last-in-time to said pulses from said pulse source being connected to the first input of said multivibrator, and the corresponding one of said second plurality of "and" gates that is responsive last-in-time to said pulses from said pulse source being connected to the second input of said multivibrator.

(References on following page)

References Cited in the file of this patent

UNITED STATES PATENTS

| | | |
|---|---|---|
| 2,403,561 | Smith | July 9, 1946 |
| 2,674,733 | Robbins | Apr. 6, 1954 |
| 2,719,228 | Auerbach et al. | Sept. 27, 1955 |
| 2,733,431 | Steel | Jan. 31, 1956 |

OTHER REFERENCES

Electronic Engineering, April 1947, pp. 105–108, "The Eniac—High Speed Electronic Calculating Machine," Wilkes.

Electronics, Nov. 1950, pp. 94–7, "32 Channel High-Speed Commutator" by Alpert et al. (Fig. 1, pp. 94 relied upon.)